US012568113B2

(12) United States Patent (10) Patent No.: US 12,568,113 B2
Weiner et al. (45) Date of Patent: Mar. 3, 2026

(54) METHOD FOR DETECTING A MANIPULATION OF A MESSAGE OF A BUS SYSTEM OF A VEHICLE

(71) Applicant: Bayerische Motoren Werke Aktiengesellschaft, Munich (DE)

(72) Inventors: Michael Weiner, Munich (DE); Peter Winklhofer, Munich (DE); Robert Meinlschmidt, Munich (DE); Theresa Reiner, Munich (DE); Markus Anton, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 208 days.

(21) Appl. No.: 18/553,984

(22) PCT Filed: Feb. 11, 2022

(86) PCT No.: PCT/EP2022/053365
§ 371 (c)(1),
(2) Date: Oct. 4, 2023

(87) PCT Pub. No.: WO2022/238021
PCT Pub. Date: Nov. 17, 2022

(65) Prior Publication Data
US 2024/0187448 A1 Jun. 6, 2024

(30) Foreign Application Priority Data

May 11, 2021 (DE) ..................... 10 2021 112 328.3

(51) Int. Cl.
| | |
|---|---|
| *H04L 9/40* | (2022.01) |
| *G06N 3/08* | (2023.01) |
| *H04W 4/48* | (2018.01) |

(52) U.S. Cl.
CPC ........... *H04L 63/1466* (2013.01); *G06N 3/08* (2013.01); *H04L 63/1416* (2013.01); *H04W 4/48* (2018.02)

(58) Field of Classification Search
CPC ... H04L 63/1466; H04L 63/1416; G06N 3/08; H04W 4/48
See application file for complete search history.

(56) References Cited

U.S. PATENT DOCUMENTS

| | | | |
|---|---|---|---|
| 2019/0173902 A1 | 6/2019 | Takahashi et al. | |
| 2019/0199743 A1* | 6/2019 | La Marca | ............. H04L 41/145 |

(Continued)

FOREIGN PATENT DOCUMENTS

| | | |
|---|---|---|
| DE | 102013200535 A1 | 7/2014 |
| DE | 102017214661 A1 | 2/2019 |

(Continued)

OTHER PUBLICATIONS

International Search Report corresponding to International Patent Application No. PCT/EP2022/053365, dated Jun. 30, 2022 (7 pages).

(Continued)

*Primary Examiner* — Shirley X Zhang
(74) *Attorney, Agent, or Firm* — Maginot, Moore & Beck LLP

(57) ABSTRACT

A method of using a controller of a vehicle to detect manipulation of a message of a bus system of the vehicle is disclosed herein. The method includes receiving, at the controller, the message from the bus system of the vehicle, and ascertaining a state of a learning method of the controller based on a vehicle state. When the state of the learning method indicates that the learning method is not trained: the method further includes training the learning method using the received message. When the state of the learning method (Continued)

indicates that the learning method is trained, the method further includes using the trained learning method to detect manipulation of the message. The method also includes providing an alarm message from the controller to a server outside of the vehicle when the trained learning method has detected manipulation of the message.

20 Claims, 2 Drawing Sheets

(56) References Cited

U.S. PATENT DOCUMENTS

| | | | | |
|---|---|---|---|---|
| 2019/0385057 | A1* | 12/2019 | Litichever | H04L 63/14 |
| 2021/0044610 | A1 | 2/2021 | Kishikawa et al. | |
| 2021/0203682 | A1* | 7/2021 | Bajpai | H04L 63/0435 |
| 2022/0234626 | A1* | 7/2022 | El Rifai | G06F 16/9566 |
| 2022/0356747 | A1* | 11/2022 | Choi | E05F 15/73 |
| 2022/0374515 | A1* | 11/2022 | Bridges | G06F 21/554 |

FOREIGN PATENT DOCUMENTS

| | | | |
|---|---|---|---|
| DE | 102018218902 | A1 | 5/2020 |
| EP | 3484103 | A1 | 5/2019 |
| EP | 3787936 | A1 | 3/2021 |
| WO | 2021030123 | A1 | 2/2021 |

OTHER PUBLICATIONS

Written Opinion corresponding to International Patent Application No. PCT/EP2022/053365, dated Jun. 30, 2022 (11 pages).
German Search Report corresponding to German Patent Application No. 10 2021 112 328.3, dated Jan. 17, 2022. (5 pages).
Anonymous, "Maschinelle Lernen—Wikipedia—Version from Apr. 28, 2021" Apr. 28, 2021 (Apr. 28, 2021), Retrieved from the Internet: https://de.wikipedia.org/w/index.php?title=Machine_Lernen &oldid=211393971.

* cited by examiner

100

METHOD FOR DETECTING A MANIPULATION OF A MESSAGE OF A BUS SYSTEM OF A VEHICLE

CROSS-REFERENCE TO RELATED APPLICATIONS

The present application is the U.S. national phase of PCT Application PCT/EP2022/053365 filed on Feb. 11, 2022, which claims priority of German patent application No. 102021112328.3 filed on May 11, 2021, the entire contents of which are incorporated herein by reference.

TECHNICAL FIELD

The disclosure relates to detecting manipulation of a message of a bus system of a vehicle.

BACKGROUND

Controllers are commonly used in vehicles. Controllers (which may also be referred to herein as "control units," "processors" or "microprocessors") include circuits (e.g., integrated circuits) that contain typical functionality of central processing units (CPU) and are configured to perform various calculations and analysis based on manufacturer programming. Examples of controllers used in vehicles include any of various Engine Control Units (ECNs) commonly used by different manufacturers in modern automobiles.

Control units of vehicles are often connected via bus systems. The control units of the vehicle can exchange messages via a bus system. The communication via a bus system follows a predefined specification. The specification can specify, for example, messages and contents of the communication via the bus system. For a typical communication between control units of a vehicle via a bus system, use is often only made of a subset of the predefined specification, however. The prior art, however, does not disclose any check as to whether a communication of a control unit via a bus system constitutes a typical communication or whether there is a deviation from the typical communication.

It would therefore be advantageous to use a control unit to detect a deviation of a bus communication in an efficient manner. In particular, one advantage would be to use a control unit of the vehicle to detect a deviation of a bus communication from a typical bus communication in an efficient manner.

The foregoing advantages may be achieved, at least in part, by the features of the independent claims. Additional advantageous configurations and developments are also apparent from the dependent claims.

SUMMARY

According to a first aspect, a method is disclosed for using a control unit of a vehicle to detect manipulation of a message of a bus system of a vehicle. The method can be a method implemented by a computer and/or a method implemented by a control unit. The vehicle can be a motor vehicle. The bus system can be a vehicle-specific bus. For example, the bus system can be a CAN bus. The method comprises the control unit of the vehicle receiving the message from the bus system of the vehicle. Furthermore, the method comprises ascertaining a state of a learning method of the control unit on the basis of a vehicle state. The vehicle state can be an operating mode of the vehicle or an operating state of a control unit of the vehicle. If the state of the learning method indicates that the learning method is not trained, the method comprises training the learning method using the received message. If the state of the learning method indicates that the learning method is trained, the method comprises using the trained learning method to detect manipulation of the message and the control unit providing an alarm message to a server outside of the vehicle if the trained learning method has detected manipulation of the message.

Advantageously, the method can detect a manipulated message in an efficient manner. The receiving control unit can detect the manipulation regardless of the sender of the message. By training the learning method on the basis of a vehicle state, it is possible to adapt the method to a change to the control unit, for example a replacement or a software update of the control unit, in an efficient manner such that manipulation of the message is detected even when changes have been made to the control unit.

According to one advantageous embodiment, a sender of the message can address the message to the control unit of the vehicle as the recipient, and/or the control unit can receive the message from the bus system to which the control unit is linked. Furthermore, the message can comprise metadata and/or content data, and/or the message can comprise a message type.

According to a further advantageous embodiment, the learning method can learn a time characteristic of messages of a message type of the received message, and/or the learning method can learn a discrete value or a continuous value range of one or more parameters of the metadata of the received message, and/or the learning method can learn a discrete value or a continuous value range of one or more parameters of the content of the received message. The learning method can thus learn various characteristics and/or parameters of the message.

Furthermore, the learning method can learn combinations of characteristics and/or parameters of the message in an efficient manner. The learning method can learn a typical communication of the bus system on the basis of the received messages in an efficient manner, in particular on the basis of the metadata and content data of the received messages.

According to a further advantageous configuration, the method can further comprise setting the state of the learning method as not trained after the control unit has been programmed for the first time or has been reprogrammed. It is thus possible to relearn, in an efficient manner, the typical communication of the bus system after a changed software configuration of the control unit.

According to a further advantageous embodiment, the method can further comprise setting the state of the learning method as trained after a predefined operating time of the vehicle, in particular a predefined operating time of the control unit of the vehicle, and/or setting the state of the learning method as trained on the basis of a multiplicity of learning parameters which have been learned during test drives of the vehicle. It is thus possible to control first-time learning or relearning of the typical communication of the bus system in an efficient manner.

According to a further advantageous embodiment, using the trained learning method to detect manipulation of the message can comprise checking the plausibility of the time characteristic of messages of the message type of the received message with regard to the learned time characteristic of the messages, and/or using the trained learning method to detect manipulation of the message can comprise checking the plausibility of one or more parameters of the metadata of the received message with regard to the learned, discrete value or with regard to the learned, continuous value range of the one or more parameters of the metadata, and/or using the trained learning method to detect manipulation of the message can comprise checking the plausibility of one or more parameters of the content of the received message with regard to the learned, discrete value or with regard to the learned, continuous value range of the one or more parameters of the content. It is thus possible to use the control unit receiving the message to detect manipulation of the message in an efficient manner.

According to a further advantageous configuration, the learning method can be a neural network, and/or the training of the learning method can determine a multiplicity of learning parameters of the learning method so long as the state of the learning method indicates that the learning method is not trained, and/or the method can comprise using the trained learning method to detect manipulation of the message using the determined multiplicity of learning parameters. It is thus possible to learn characteristics and/or parameters of the message in an efficient manner.

According to a further aspect, at least one embodiment is characterized by a computer-readable medium using a control unit to detect manipulation of a message of a bus system of a vehicle, wherein the computer-readable medium comprises instructions which, when executed on the control unit, perform the above-described method.

According to a further aspect, at least one embodiment is characterized by a system using a control unit to detect manipulation of a message of a bus system of a vehicle, wherein the system is designed to perform the above-described method.

According to a further aspect, at least one embodiment is characterized by a vehicle comprising the above-described system using a control unit to detect manipulation of a message of a bus system of a vehicle.

Further features of various embodiments are apparent from the claims, the figures and the description of the figures. All features and combinations of features mentioned previously in the description and the features and combinations of features mentioned subsequently in the description of the figures and/or shown in the figures themselves can be used not only in the respectively specified combination but also in other combinations or else by themselves.

BRIEF DESCRIPTION OF THE DRAWINGS

A preferred exemplary embodiment will be described below on the basis of the attached drawings. Further details, preferred configurations and developments of various embodiments are apparent therefrom. Specifically.

DESCRIPTION

Figure 1:
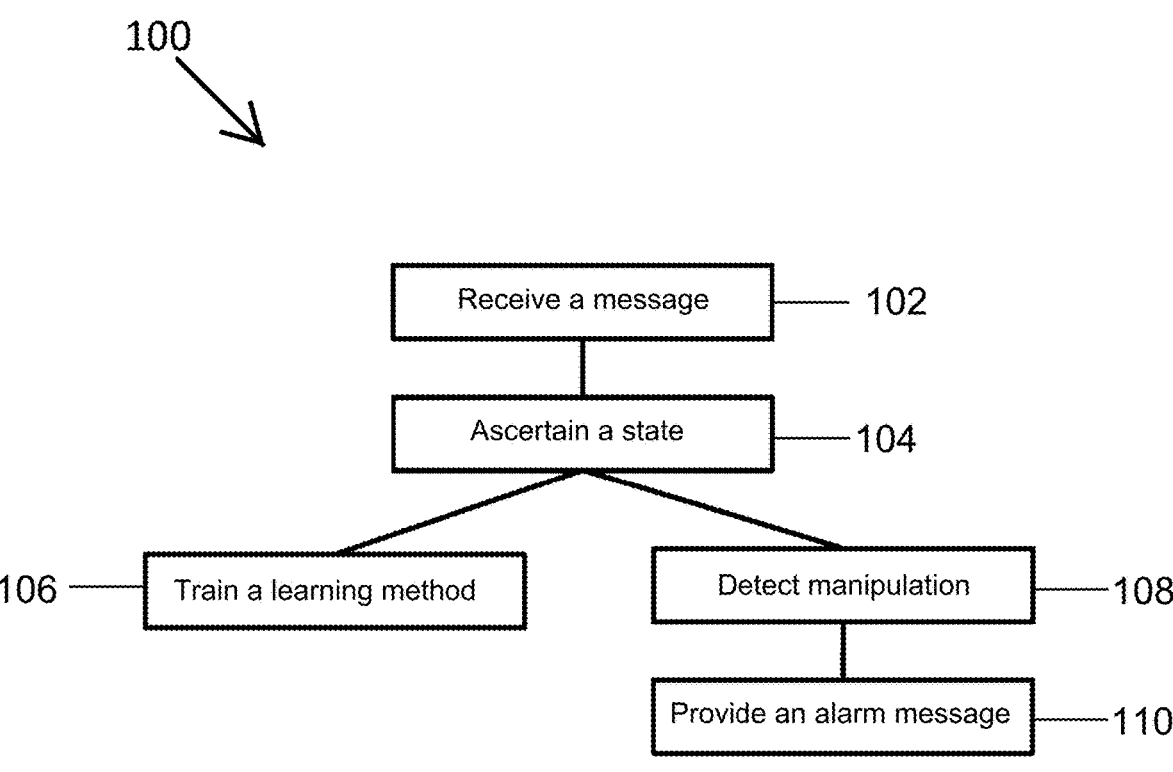
FIG. 1 schematically shows an exemplary method for detecting manipulation of a message, and FIG. 2 schematically shows an exemplary system for detecting manipulation of a message.

In detail, FIG. 1 shows an exemplary method 100 of using a control unit of a vehicle to detect manipulation of a message of a bus system of the vehicle. The method 100 is preferably performed on a control unit receiving the message. The bus system of a vehicle comprises a multiplicity of messages which can be specified by the bus system. For example, for a message, it is possible to specify a message type, metadata, and/or one or more parameters of a content of the message. A control unit of the vehicle, which control unit is connected to the bus system, can typically receive a portion of the messages which are specified by a specification of the bus system. The portion of the messages which a control unit of the vehicle receives during non-manipulated operation of a vehicle corresponds to a typical communication of the control unit via the bus system.

The method 100 for detecting the manipulation of the message can be performed in parallel with the processing of the received message by the control unit. For this purpose, the control unit can create a copy of the received message and forward it to the method 100 for detecting the manipulation of the message. Alternatively, the method 100 can be performed before the received message is processed by the control unit. As a result, it is possible to prevent a received, manipulated message from being executed by the control unit. Security when executing the received message can therefore be increased in an efficient manner.

The method 100 can ascertain 104 a state of a learning method or of a learning function of the control unit on the basis of a vehicle state. The vehicle state can comprise an operating mode of the vehicle and/or an operating period of the control unit and/or of the vehicle. If the state of the learning method indicates that the learning method is not trained, the learning method can be trained 106 using the received message. The learning method can be a known learning method. For example, the learning method can be a neural network. The learning method can extract, from the received message, time information for ascertaining a time characteristic, metadata and content data and the learning method can be trained using this data so long as the state of the learning method indicates that the learning method is not trained. If the state of the learning method indicates that the learning method is trained, the method 100 can use the trained, first learning method to detect 108 manipulation of the message and can provide 110 an alarm message from the control unit to a server outside of the vehicle if the trained learning method has detected manipulation of the message.

The method 100 can for example receive a message which comprises a distance signal. The learning method has learned a typical time characteristic of the messages having distance signals. If the control unit receives the messages having the distance signal less often than is specified by the typical time characteristic of the messages, the method detects manipulation of the received message and transmits an alarm message to a server outside of the vehicle. A deviation from the typical time characteristic of messages having the distance signal may suggest manipulation of a mileage status of the vehicle. The control unit can therefore detect and report this manipulation.

Figure 2:
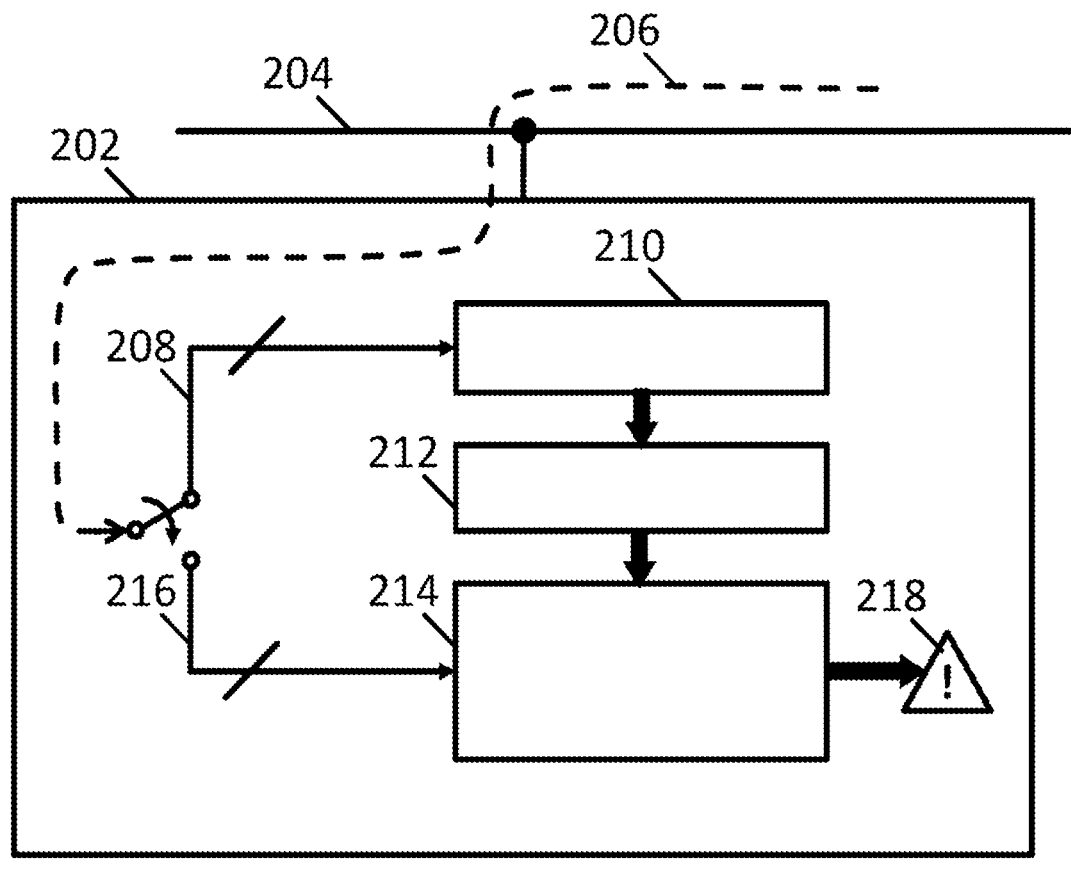

In detail, FIG. 2 shows an exemplary system 200 for detecting manipulation of a message. The system 200 comprises a control unit 202 which is connected to a bus system 204. The control unit 202 can receive a series of messages 206 from the bus system 204. The series of messages comprises at least one message. The series of messages preferably comprises a plurality of messages. The series of messages 206 can be forwarded to a learning function 210 in a learning phase 208. The learning function 210 can learn a time characteristic, metadata, and/or content data from the series of messages. In other words, the learning function 210 can be trained using the time characteristic, the metadata, and/or the content data of the series of messages. The result of the learning are learned data 212 and a trained learning function. The learned data 212 and the trained learning function can be used as an assessment function 214 in order to detect manipulation of a message in the series of messages of an assessment phase 216. If the assessment function detects manipulation of a message, the assessment function 216 can generate an alarm message 218. The alarm message 218 can be provided from the control unit 202 to a server outside of the vehicle.

Advantageously, the method 100 and the system 200 can detect manipulation of a received message in an efficient manner. A typical communication of the control unit 202 can be learned in a learning phase by a learning function or a learning method. In an assessment phase, the trained learning function or the trained learning method detects deviations from the learned data. As a result, it is possible for the receiving control unit to detect a manipulated message in an efficient manner.

LIST OF REFERENCE SIGNS

100 method
102 receive a message
104 ascertain a state
106 train a learning method
108 detect manipulation of the message
110 provide an alarm message
200 system
202 control unit
204 bus system
206 message or messages
208 learning phase
210 learning function
212 learned data
214 assessment function
216 assessment phase
218 alarm message

What is claimed is:

1. A method of using a controller of a vehicle to detect manipulation of a message of a bus system of the vehicle:

receiving, at the controller, the message from the bus system of the vehicle;

ascertaining a state of a learning method of the controller based on a vehicle state;

when the state of the learning method indicates that the learning method is not trained:

training the learning method using the received message;

when the state of the learning method indicates that the learning method is trained:

using the trained learning method to detect manipulation of the message; and providing an alarm message from the controller to a server outside of the vehicle when the trained learning method has detected manipulation of the message;

wherein the state of the learning method is set as trained after a predefined operating time of the vehicle.

2. The method as claimed in claim 1, wherein a sender of the message addresses the message to the controller of the vehicle as a recipient;

wherein the controller receives the message from the bus system to which the controller is linked;

wherein the message comprises metadata and/or content data; and wherein the message comprises a message type.

3. The method as claimed in claim 2, wherein the learning method learns a time characteristic of messages of a message type of the received message;

wherein the learning method learns a discrete value or a continuous value range of one or more parameters of the metadata of the received message; and wherein the learning method learns a discrete value or a continuous value range of one or more parameters of the content data of the received message.

4. The method as claimed in claim 1, the method further comprising:

setting the state of the learning method as not trained after the controller has been programmed for a first time or has been reprogrammed.

5. The method as claimed in claim 1, wherein the predefined operating time of the vehicle is a predefined operating time of the controller of the vehicle; and wherein setting the state of the learning method as trained is further based on a multiplicity of learning parameters which have been learned during test drives of the vehicle.

6. The method as claimed in claim 1, wherein using the trained learning method to detect manipulation of the message comprises checking a plausibility of the time characteristic of messages of the message type of the received message with regard to the learned time characteristic of the messages;

wherein using the trained learning method to detect manipulation of the message comprises checking a plausibility of one or more parameters of metadata of the received message with regard to the learned, discrete value or with regard to the learned, continuous value range of the one or more parameters of the metadata; and wherein using the trained learning method to detect manipulation of the message comprises checking a plausibility of one or more parameters of content data of the received message with regard to the learned, discrete value or with regard to the learned, continuous value range of the one or more parameters of the content data.

7. The method as claimed in claim 1, wherein the learning method is a neural network; and/or wherein the training of the learning method determines a multiplicity of learning parameters of the learning method so long as the state of the learning method indicates that the learning method is not trained; and wherein using the trained learning method to detect manipulation of the message includes using the determined multiplicity of learning parameters.

8. A non-transient computer-readable medium using a controller of a vehicle to detect manipulation of a message of a bus system of the vehicle, wherein the computer-readable medium comprises instructions which, when executed by the controller, cause the controller to:

receive the message from the bus system of the vehicle;

ascertain a state of a learning method of the controller based on a vehicle state;

when the state of the learning method indicates that the learning method is not trained:

train the learning method using the received message;

when the state of the learning method indicates that the learning method is trained:

use the trained learning method to detect manipulation of the message; and provide an alarm message from the controller to a server outside of the vehicle when the trained learning method has detected manipulation of the message;

wherein the instructions further cause the controller to set the state of the learning method as trained after a predefined operating time of the vehicle.

9. The non-transient computer-readable medium of claim 8,
   wherein the received message is addressed to the controller of the vehicle as a recipient;
   wherein the controller is configured to receive the message from the bus system to which the controller is linked;
   wherein the message comprises metadata and/or content data; and
   wherein the message comprises a message type.

10. The non-transient computer-readable medium of claim 9,
   wherein the learning method learns a time characteristic of messages of a message type of the received message; and/or
   wherein the learning method learns a discrete value or a continuous value range of one or more parameters of the metadata of the received message; and
   wherein the learning method learns a discrete value or a continuous value range of one or more parameters of the content of the received message.

11. The non-transient computer-readable medium of claim 8, wherein the computer readable medium is further configured to, when executed by the controller:
   set the state of the learning method as not trained after the controller has been programmed for the first time or has been reprogrammed.

12. The non-transient computer-readable medium of claim 8, wherein the computer readable medium is further configured to, when executed by the controller:
   set the state of the learning method as trained after a predefined operating time of the controller of the vehicle; and
   set the state of the learning method as trained based on a multiplicity of learning parameters which have been learned during test drives of the vehicle.

13. The non-transient computer-readable medium of claim 8,
   wherein using the trained learning method to detect manipulation of the message comprises checking a plausibility of the time characteristic of messages of the message type of the received message with regard to the learned time characteristic of the messages;
   wherein using the trained learning method to detect manipulation of the message comprises checking a plausibility of one or more parameters of metadata of the received message with regard to the learned, discrete value or with regard to the learned, continuous value range of the one or more parameters of the metadata; and
   wherein using the trained learning method to detect manipulation of the message comprises checking a plausibility of one or more parameters of content data of the received message with regard to the learned, discrete value or with regard to the learned, continuous value range of the one or more parameters of the content data.

14. The non-transient computer-readable medium of claim 8,
   wherein the learning method is a neural network;
   wherein the training of the learning method determines a multiplicity of learning parameters of the learning method so long as the state of the learning method indicates that the learning method is not trained; and
   wherein using the trained learning method to detect manipulation of the message includes using the determined multiplicity of learning parameters.

15. A vehicle comprising:
a bus system; and
a controller configured to:
   receive a message from the bus system of the vehicle;
   ascertain a state of a learning method of the controller based on a vehicle state;
   when the state of the learning method indicates that the learning method is not trained:
      train the learning method using the received message;
   when the state of the learning method indicates that the learning method is trained:
      use the trained learning method to detect manipulation of the message; and
   provide an alarm message from the controller to a server outside of the vehicle when the trained learning method has detected manipulation of the message;
   wherein the state of the learning method is set as trained after a predefined operating time of the vehicle.

16. The vehicle of claim 15,
wherein the received message is addressed to the controller of the vehicle as a recipient;
wherein the controller is configured to receive the message from the bus system to which the controller is linked;
wherein the message comprises metadata and/or content data; and
wherein the message comprises a message type.

17. The vehicle of claim 16,
wherein the learning method includes learning a time characteristic of messages of a message type of the received message;
wherein the learning method includes learning a discrete value or a continuous value range of one or more parameters of the metadata of the received message; and
wherein the learning method includes learning a discrete value or a continuous value range of one or more parameters of the content of the received message.

18. The vehicle of claim 15, wherein the controller is further configured to set the state of the learning method as not trained after the controller has been programmed for the first time or has been reprogrammed.

19. The vehicle of claim 15, wherein the controller is further configured to:
   set the state of the learning method as trained after a predefined operating time of the controller of the vehicle; and
   set the state of the learning method as trained based on a multiplicity of learning parameters which have been learned during test drives of the vehicle.

20. The vehicle of claim 15,
wherein using the trained learning method to detect manipulation of the message comprises checking a plausibility of the time characteristic of messages of the message type of the received message with regard to the learned time characteristic of the messages;
wherein using the trained learning method to detect manipulation of the message comprises checking a plausibility of one or more parameters of metadata of the received message with regard to the learned, discrete value or with regard to the learned, continuous value range of the one or more parameters of the metadata; and
wherein using the trained learning method to detect manipulation of the message comprises checking a plausibility of one or more parameters of content data of the received message with regard to the learned, discrete value or with regard to the learned, continuous value range of the one or more parameters of the content data.

* * * * *